(12) United States Patent
Deng et al.

(10) Patent No.: US 7,679,896 B2
(45) Date of Patent: Mar. 16, 2010

(54) FIXING APPARATUS FOR DATA STORAGE DEVICE

(75) Inventors: Song Deng, Shenzhen (CN); Ke-Cheng Lin, Taipei Hsien (TW); Wen-Kang Lo, Taipei Hsien (TW); Hsuan-Tsung Chen, Taipei Hsien (TW); Guang-Yao Lee, Taipei Hsien (TW); Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 372 days.

(21) Appl. No.: 11/748,504

(22) Filed: May 15, 2007

(65) Prior Publication Data

US 2008/0089021 A1 Apr. 17, 2008

(30) Foreign Application Priority Data

Oct. 11, 2006 (CN) .................... 2006 2 0015156 U

(51) Int. Cl.
*G06F 1/16* (2006.01)

(52) U.S. Cl. ............................ 361/679.33; 361/679.34; 361/727; 361/818; 312/223.1; 312/223.2

(58) Field of Classification Search ............. 361/679.33
See application file for complete search history.

(56) References Cited

U.S. PATENT DOCUMENTS

| 5,142,447 | A  | * | 8/1992  | Cooke et al. ............. 361/679.4 |
| 6,196,516 | B1 | * | 3/2001  | Lan ............................. 248/634 |
| 6,654,240 | B1 |   | 11/2003 | Tseng et al. |
| 6,798,651 | B2 | * | 9/2004  | Syring et al. ........... 361/679.34 |
| 7,495,904 | B2 | * | 2/2009  | Liang et al. .................. 361/727 |
| 2006/0171109 | A1 | * | 8/2006  | Chang ......................... 361/685 |
| 2008/0158810 | A1 | * | 7/2008  | Liu et al. ..................... 361/685 |
| 2008/0259554 | A1 | * | 10/2008 | Qin et al. ..................... 361/685 |

* cited by examiner

*Primary Examiner*—Jayprakash N Gandhi
*Assistant Examiner*—Anthony Q Edwards
(74) *Attorney, Agent, or Firm*—Frank R. Niranjan

(57) ABSTRACT

A fixing apparatus for holding a data storage device is provided. The fixing apparatus includes a drive bracket, and an insertion rack. The drive bracket includes two opposite side panels. Each of the side panels forms at least one guiding portion and defines a slot therein. The insertion rack is configured for inserting the data storage device into the drive bracket. The insertion rack forms two hooks. The insertion rack is capable of sliding into the drive bracket along the guiding portions. The hooks ride along an exterior of the drive bracket until they are inserted into the corresponding slots of the drive bracket.

11 Claims, 4 Drawing Sheets

FIXING APPARATUS FOR DATA STORAGE DEVICE

BACKGROUND OF THE INVENTION

1. Field of the Invention

The present invention relates to fixing apparatuses for data storage devices, and particularly to a fixing apparatus which readily mounts a data storage device to a drive bracket.

2. Description of Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. However, fixing a data storage device to a drive bracket with bolts is unduly laborious and time-consuming. Furthermore, the computer enclosure needs extra operating space for carrying out the fixing operation. Fixing a data storage device in a drive bracket using rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure.

What is desired, therefore, is to provide a fixing apparatus which readily attach a data storage device to a drive bracket.

SUMMARY OF THE INVENTION

An exemplary fixing apparatus for holding a data storage device is provided. The fixing apparatus includes a drive bracket, and an insertion rack. The drive bracket includes two opposite side panels. Each of the side panels forms at least one guiding portion and defines a slot therein. The insertion rack is configured for inserting the data storage device into the drive bracket. The insertion rack is capable of sliding into the drive bracket along the guiding portions. The hooks ride along an exterior of the drive bracket until they are inserted into the corresponding slots of the drive bracket.

Other advantages and novel features of the present invention will become more apparent from the following detailed description of preferred embodiment when taken in conjunction with the accompanying drawings, in which:

DETAILED DESCRIPTION OF THE INVENTION

Figure 1:
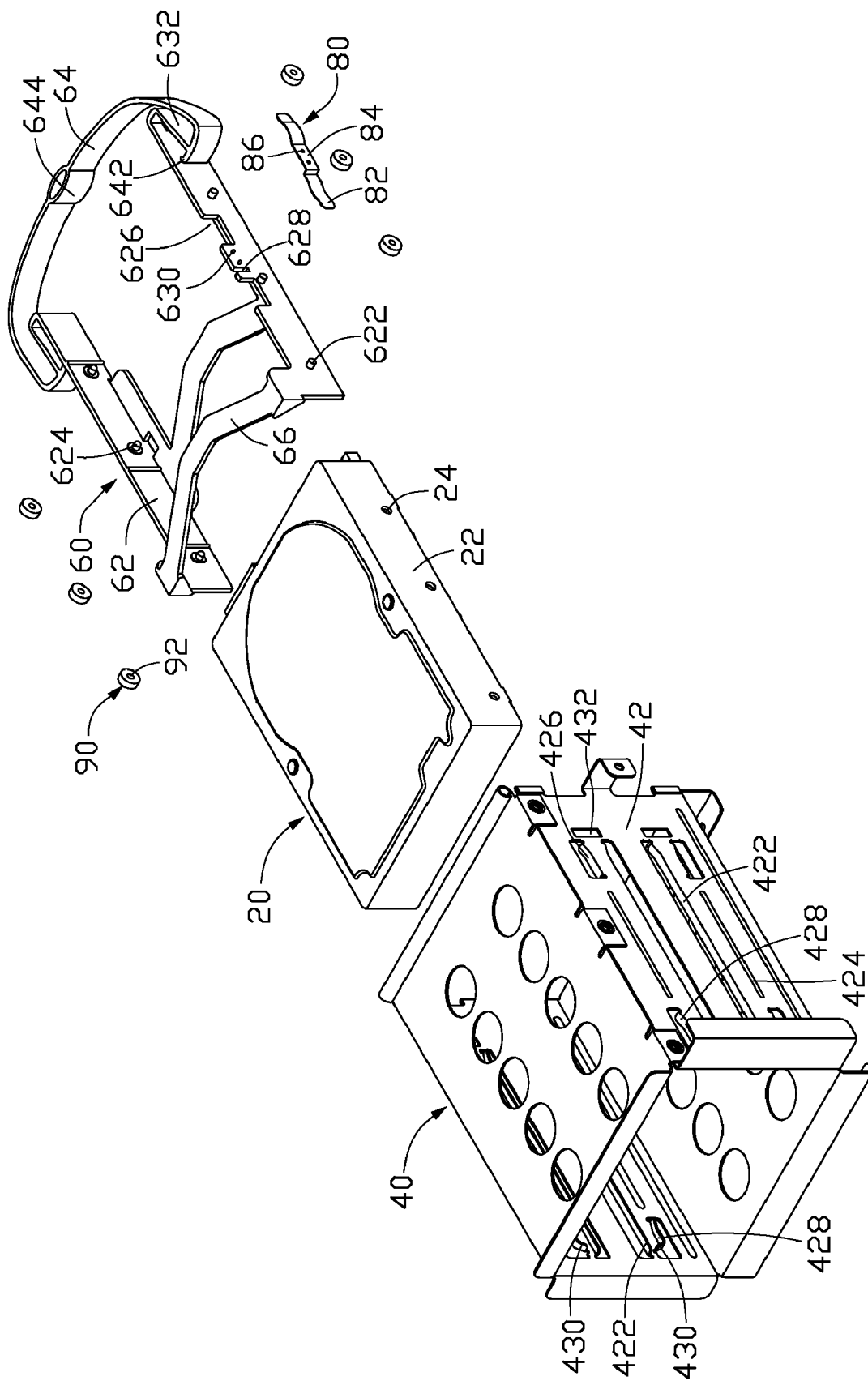
FIG. 1 is an explosive, isometric view of a fixing apparatus in accordance with a preferred embodiment of the present invention, together with a data storage device, the fixing apparatus including a drive bracket, an insertion rack, an elastic member, and a plurality of gaskets.

Referring to FIG. 1, a fixing apparatus in accordance with a preferred embodiment of the present invention is provided to attach a data storage device 20 to an enclosure of an electronic device (not shown) such as a computer. The fixing apparatus includes a drive bracket 40 fixed to the enclosure, an insertion rack 60 for inserting the data storage device 20 into the drive bracket 40, an elastic member 80 for draining static charges, and a plurality of gaskets 90 for absorbing vibration from the data storage device 20. In this embodiment, the data storage device 20 is a hard disk drive. The data storage device 20 includes two opposite sidewalls 22. Each sidewall 22 defines a plurality of fixing holes 24 therein.

The drive bracket 40 includes two parallel side panels 42. Each side panel 42 forms a slide tab 422 extending into a receiving space defined in drive bracket 40, and a rail 424 protruding into the receiving space of drive bracket 40. A guiding tab 426 and a blocking tab 428 are formed on each side panel 42, respectively adjacent a front end and a rear end of the rail 424. A rear end of the blocking tab 428 is bent to the slide tab 422 to form a blocking portion 430. A slot 432 is defined in each side panel 42, adjacent the guiding tab 426.

The insertion rack 60 is made of elastic material, such as rubber or plastic. The insertion rack 60 includes two sidewalls 62, and a handle 64 connecting two adjacent ends of the sidewalls 62. Each sidewall 62 forms a plurality of protruding posts 622 on an outer surface thereof, and a plurality of fixing posts 624 on an inner surface thereof. One sidewall 62 defines two cutouts 626 in an upper edge thereof. A notch 628 is defined in the one sidewall 62 between the two cutouts 626. Two positioning posts 630 extend from the outer surface of the one sidewall 62, adjacent the notch 628. Each sidewall 62 forms a resilient portion 632 on a front end thereof. The resilient portions 632 are bent out and back, to be generally parallel with the sidewalls 62. The handle 64 is C-shaped. Two hooks 642 are formed on two ends of the handle 64, respectively. The handle 64 connects with the resilient portions 632 at two ends thereof, adjacent the hooks 642. An operating portion 644 is formed on a middle portion of the handle 64. Two bridges 66 are formed between the sidewalls 62, for connecting lower edges of the middle portions and upper edges of rear ends of the sidewalls 62. The bridges 66 cooperate with the sidewalls 62 to define an insertion space for the data storage device 20.

The elastic member 80 consists of electrically conductive material, and includes two arcuate spring tabs 82 having domed portions extending in opposite directions, and an L-shaped positioning tab 84 connected between the spring tabs 82. Two positioning holes 86 are defined in the positioning tab 84.

The gaskets 90 are made of rubber or plastic. Each gasket 90 defines a through hole 92 therein.

Figure 2:
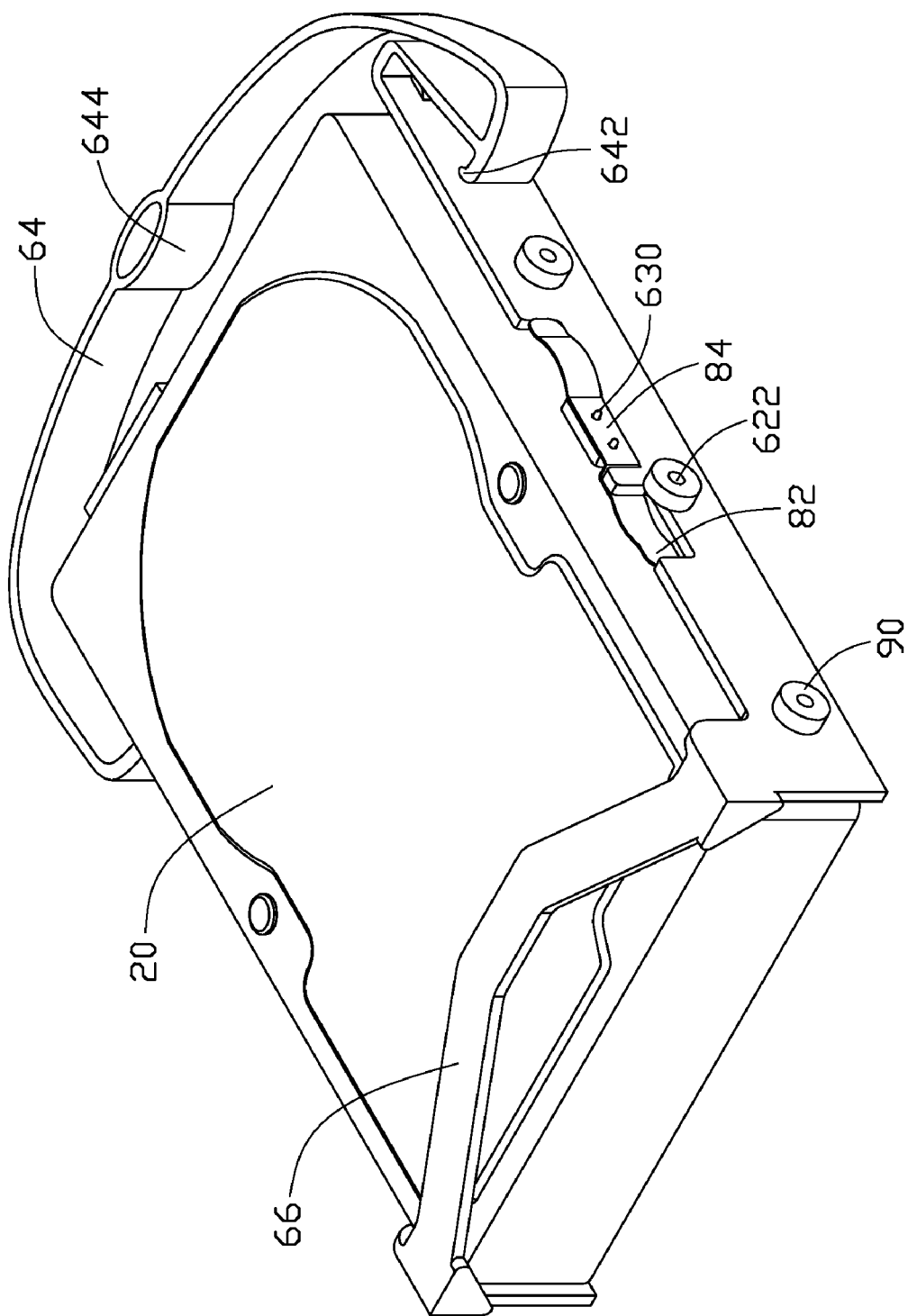
FIG. 2 is an assembled view of the data storage device, the insertion rack, the elastic member, and the gaskets.
Figure 3:
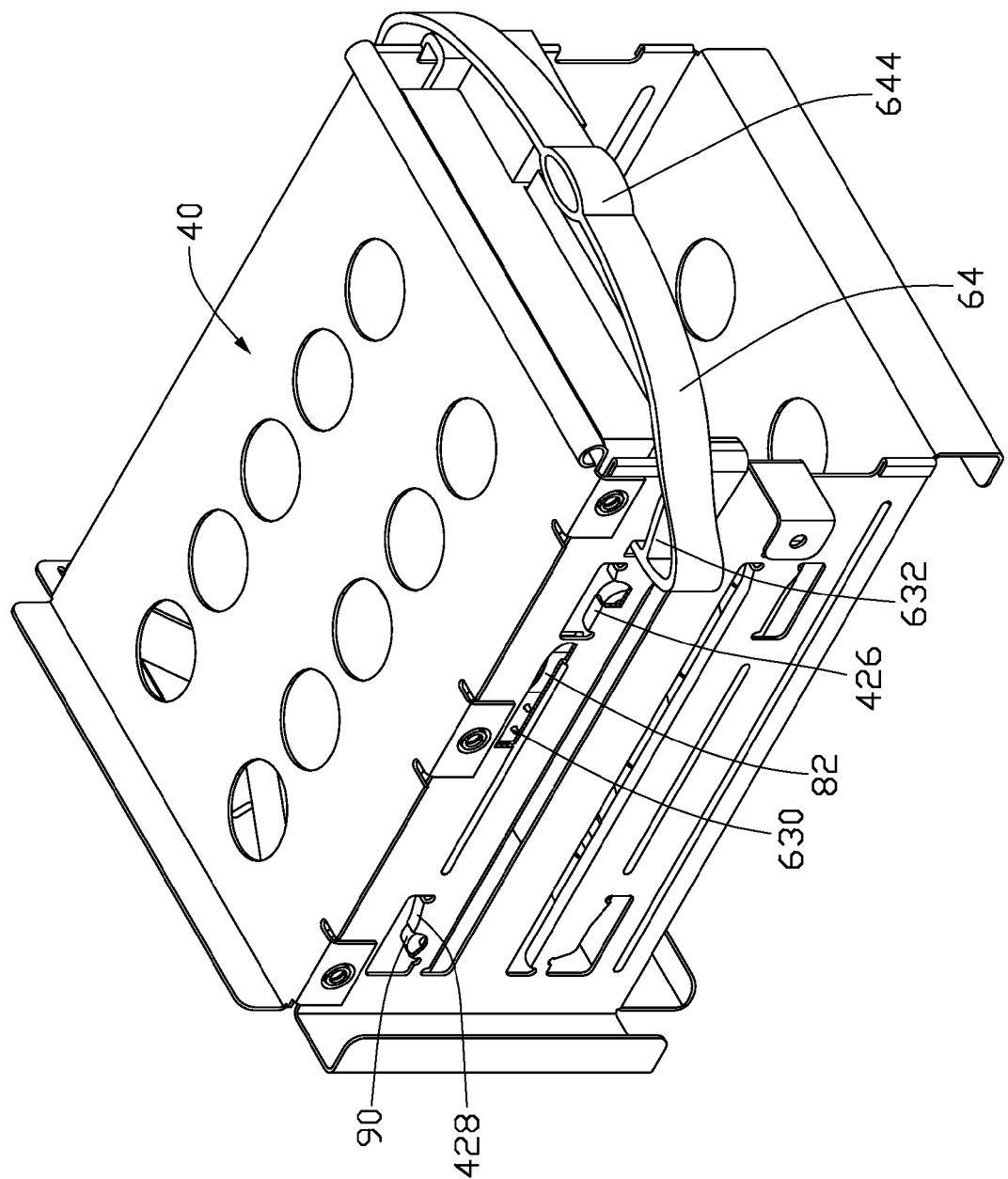
FIG. 3 is an assembled view of FIG. 1, but partly cutaway.

Referring to FIGS. 2 and 3, in assembling, the data storage device 20 slides into the insertion space of the insertion rack 60. The fixing posts 624 of the insertion rack 60 are inserted into the corresponding fixing holes 24 of the data storage device 20. The data storage device 20 is held by the bridges 66 engaging with two opposite panels thereof. Therefore, the data storage device 20 is assembled in the insertion rack 60. An end of the positioning tab 84 of the elastic member 80 is inserted in the notch 628 of the insertion rack 60. The positioning posts 630 of the insertion rack 60 are inserted into the positioning holes 86 defined in the other end of the positioning tab 84. Therefore, the elastic member 80 is mounted to the insertion rack 60. The spring tabs 82 of the elastic member 80 cover the cutouts 626 of the sidewall 62 of the insertion rack 60, respectively. One of the spring tabs 82 is in the insertion space of the insertion rack 60 and abuts against the corresponding sidewall 22 of the data storage device 20. The positioning posts 622 of the insertion rack 60 are inserted into the through holes 92 of the gaskets 90 to thereby attach the gaskets 90 to the outer surfaces of the sidewalls 62. The insertion rack 60 with the data storage device 20 is pushed into the receiving space of the drive bracket 40. The gaskets 90 slide along the slide tabs 422, the guiding tabs 426, and the rails 424 of the drive bracket 40, until the two gaskets 90 positioned at the rear ends of the sidewalls 62 of the insertion rack 60 are blocked by the blocking portions 430 of the blocking tabs 428. The resilient portions 632 of the insertion rack 60 are deformed outwardly to ride along an exterior of the drive bracket 40 when front ends of the side panels 42 enter between the resilient portions 632 and corresponding sidewall 62, until the hooks 642 of the handle 64 align with the corresponding slot 432 of the drive bracket 40. The resilient portions 632 rebound, and the hooks 642 lock into the slots 432. Thus, the insertion rack 60 and the data storage device 20 are fixed to the drive bracket 40. One spring tab 82 of the elastic member 80 abuts against the sidewall 22 of the data storage device 20, and the other spring tab 82 abuts against the side panel 42 of the drive bracket 40. Therefore, the data storage device 20 is electrically connected to the drive bracket 40 to allow static electricity to go through the drive bracket 40 to ground. The gaskets 90 are positioned between the insertion rack 60 and the drive bracket 40, for absorbing vibration from the data storage device 20.

Figure 4:
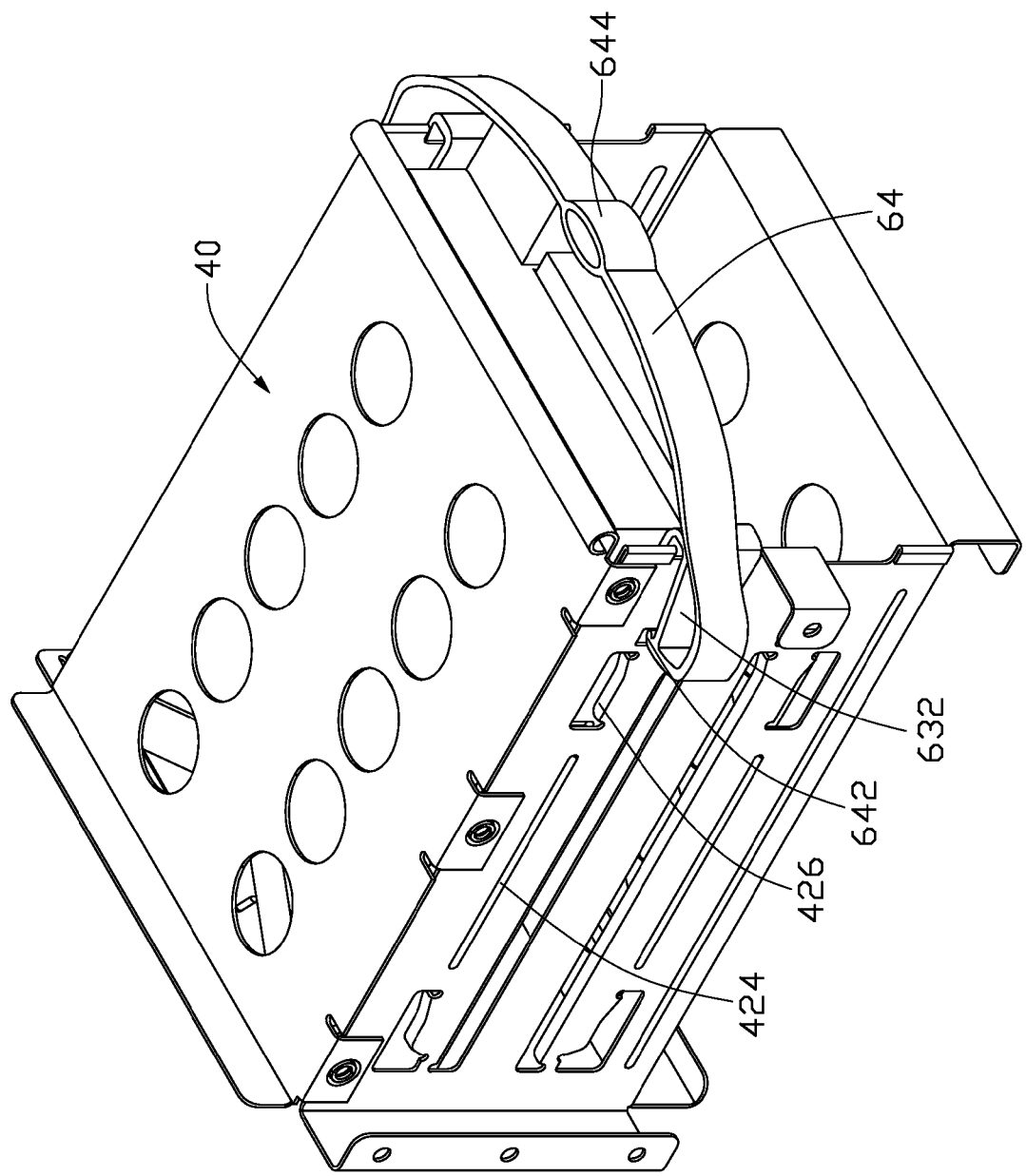
FIG. 4 is an assembled view of FIG. 1, showing the insertion rack in an unlocked state.

Referring to FIG. 4, in disassembly, the operating portion 644 of the handle 64 of the insertion rack 60 is pulled frontward. The handle 64 and the resilient portions 632 are deformed outward. The hooks 642 are disengaged from the slots 432. The insertion rack 60 and the data storage device 20 are withdrawn from the drive bracket 40. Because the data storage device 20 is held by the bridges 66 engaging with two opposite panels thereof, it will not be disengaged from the insertion rack 60 freely.

In other embodiments, the slide tabs 422, the rails 424, the guiding tabs 426, and the blocking tabs 428 of the drive bracket 40 may be placed at other positions or replaced by other guiding portions. The blocking portions 430 may be replaced by other similar elements, such as vertical tabs.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fixing apparatus for holding a data storage device, comprising:
    a drive bracket comprising two opposite side panels, each of the side panels forming at least one guiding portion and defining a slot;
    an insertion rack comprising two opposite sidewalls and a handle, each of the sidewalls forming a resilient portion bent out and back from a front end thereof, the insertion rack forming two hooks at two ends of the handle, the handle connecting with distal ends of the resilient portions on two ends thereof, adjacent the hooks, the insertion rack being configured for mounting the data storage device into the drive bracket, the insertion rack capable of sliding into the drive bracket along the guiding portions, the hooks capable of deforming outward to ride along an exterior of the drive bracket until being inserted into the corresponding slots of the drive bracket;
    a plurality of gaskets for absorbing vibration from the data storage device, each of the sidewalls of the insertion rack comprising a plurality of protruding posts for positioning the gaskets thereon; and
    wherein each of the side panels of the drive bracket forms a blocking portion configured for blocking the corresponding gasket positioned at an end of the corresponding sidewall of the insertion rack.

2. The fixing apparatus as described in claim 1, wherein each of the sidewalls of the insertion rack forms a plurality of fixing posts on an inner surface thereof, for fixing the data storage device in the insertion rack.

3. The fixing apparatus as described in claim 1, wherein two bridges are formed between the sidewalls of the insertion rack, the bridges connect middle portions and ends of the sidewalls for sandwiching the data storage device therebetween.

4. The fixing apparatus as described in claim 1, wherein the fixing apparatus further comprises an elastic member configured for electrically connecting the data storage device with the drive bracket, one end of the elastic member abuts against one of the side panels of the drive bracket, the other end of the elastic member is configured for abutting against the data storage device.

5. The fixing apparatus as described in claim 4, wherein the elastic member comprises two spring tabs, and a positioning tab connected between the spring tabs, one of the sidewalls of the insertion rack defines a notch, an end of the positioning tab is inserted in the notch.

6. The fixing apparatus as described in claim 2, wherein an opposite end of the positioning tab defines two positioning holes, the one of the sidewalls of the insertion rack forms two positioning posts, the positioning posts are inserted into the positioning holes, respectively.

7. A fixing apparatus fixing a data storage device therein, comprising:
    a drive bracket comprising two opposite side panels, each of the side panels forming at least one guiding portion and defining a slot;
    an integral insertion rack comprising two sidewalls sandwiching the data storage device therebetween in a left-and-right direction, a handle connected between the two sidewalls, and two hooks formed adjacent junctions between the handle and the sidewalls corresponding to the slots respectively, one of the sidewalls of the rack comprising a notch, and an elastic member comprising a positioning tab inserted in the notch, a spring tab extending from one end of the positioning tab and abutting against the data storage device, and another spring tab extending from an opposite end of the positioning tab and abutting against the inner side of the one of the side panels of the drive bracket, each of the spring tabs comprising an arcuate shape and the one of the sidewalls comprising a pair of cutouts facing the spring tabs for providing space to allow the spring tabs deformation;
    vibration absorbing members mounted to outer surfaces of the sidewalls of the rack and capable of sliding along the guiding portions in a front-and-back direction until the hooks insert into the corresponding slots from outside of the sidewalls in the left-and-right direction, to thereby secure the combined rack and the data storage device in the drive bracket; and
    the elastic member configured for electrically connecting the data storage device with the drive bracket, wherein one end of the elastic member abuts against an inner side of one of the side panels of the drive bracket, and the other end of the elastic member abuts against the data storage device.

8. The fixing apparatus as described in claim 4, wherein the rack further comprises a pair of bridges one of which connect upper edges of the sidewalls and the other one connect bottom upper edges of the sidewalls, the bridges sandwiching the data storage device therebetween in an up-and-down direction.

9. The fixing apparatus as described in claim 5, wherein each of the sidewalls of the rack has a resilient portion bent out and back from a front end thereof to connect with the handles, and the handle has an arcuate configuration, when the handle is pulled forward the hooks are drawn out from the corresponding slots via deformation of the handle.

10. The fixing apparatus as described in claim 4, wherein each of the vibration absorbing members comprises a column-shaped gasket having a hole, and a plurality of posts extends out from the sidewalls of the rack to be secured in a corresponding hole.

11. A fixing apparatus for holding a data storage device, comprising:

a drive bracket comprising two opposite side panels, each of the side panels forming at least one guiding portion and defining a slot;

an insertion rack comprising two opposite sidewalls and a handle, each of the sidewalls forming a resilient portion bent out and back from a front end thereof, the insertion rack forming two hooks at two ends of the handle, and the handle connecting with distal ends of the resilient portions on two ends thereof, adjacent the hooks, the insertion rack being configured for mounting the data storage device into the drive bracket, the insertion rack being capable of sliding into the drive bracket along the guiding portions, the hooks being capable of deforming outward to ride along an exterior of the drive bracket until being inserted into the corresponding slots of the drive bracket; and an elastic member comprising two spring tabs, and a positioning tab connected between the spring tabs, one of the sidewalls of the insertion rack comprising a notch, an end of the positioning tab inserted in the notch, the elastic member configured for electrically connecting the data storage device with the drive bracket, one end of the elastic member abutted against one of the side panels of the drive bracket, the other end of the elastic member configured for abutting against the data storage device, an opposite end of the positioning tab comprising two positioning holes, the one of the sidewalls of the insertion rack forming two positioning posts, the positioning posts being inserted into the positioning holes, respectively.

\* \* \* \* \*